(No Model.)
E. POOLE.
NUT LOCK.
No. 492,050. Patented Feb. 21, 1893.
Fig. 1.
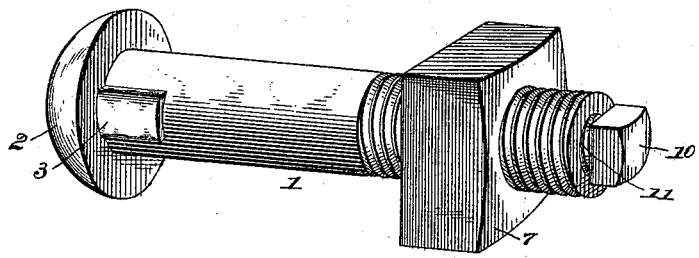
Fig. 2.
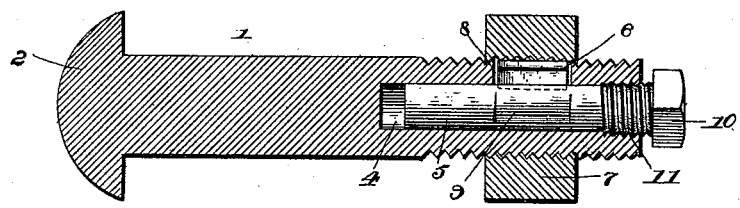
Fig. 3.  Fig. 4.
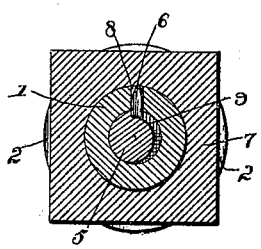 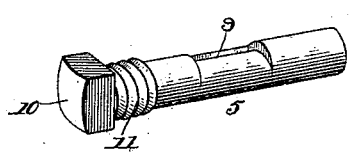
Witnesses  Inventor
F. M. Johnson  E. Poole
N. T. Riley  By his Attorneys,
  C. A. Snow & Co.

UNITED STATES PATENT OFFICE.

EDWARD POOLE, OF FORDYCE, ARKANSAS.

NUT-LOCK.

SPECIFICATION forming part of Letters Patent No. 492,050, dated February 21, 1893.

Application filed July 12, 1892. Serial No. 439,820. (No model.)

*To all whom it may concern:*

Be it known that I, EDWARD POOLE, a citizen of the United States, residing at Fordyce, in the county of Dallas and State of Arkansas, have invented a new and useful Nut-Lock, of which the following is a specification.

The invention relates to improvements in nut locks.

The object of the present invention is to provide a simple and comparatively inexpensive nut lock, which may be readily arranged to lock or release a nut, and in which the jars incident to its use will tend to lock a nut tighter instead of loosening the same.

The invention consists in the construction and novel combination and arrangement of parts hereinafter fully described, illustrated in the accompanying drawings and pointed out in the claims hereto appended.

In the drawings—Figure 1 is a perspective view of a nut lock constructed in accordance with this invention. Fig. 2 is a longitudinal sectional view. Fig. 3 is a transverse sectional view. Fig. 4 is a detail perspective view of the cam pin.

Like numerals of reference indicate corresponding parts in all the figures of the drawings.

1 designates a bolt having a head 2 and enlargements 3 to prevent it from turning and provided with a longitudinal bore 4 extending inward from the outer end and receiving a cam pin 5 which is adapted to carry a pawl 6 into engagement with a nut 7 arrranged on the bolt, whereby the nut is locked against unscrewing. The pawl 6 is arranged in a longitudinal opening 8 of the bolt, and has its outer engaging edge oppositely beveled, and it is supported upon a cam portion 9 of the pin 5, whereby when the pin 5 is turned the pawl will be caused to move outward and engage the threads of the nut 7. The pin is provided at its outer end with the polygonal head 10, and it is threaded at 11 adjacent to the head, and is adapted to screw into the outer portion of the bore 4 which is threaded a suitable distance. The threads of the pin are preferably right hand ones, so that to screw the pin in, the latter is turned to the right while the cam portion 9 which is formed by recessing the pin and which is arranged opposite the opening 8, inclines inward in a direction opposite the direction of the threads or in other words to the left, so that to turn the cam away from the opening to allow the pawl to move inward to disengage the nut, the pin is turned to the right, and to bring the pawl in engagement with the nut the pin is turned to the left, whereby in releasing the nut, the pin is screwed up and vice versa. It is well understood that jars incident to the use of bolts always tend to unscrew a nut or screw, and it will be seen that such a tendency is directed in the present device to force the pawl more closely in engagement with the nut. The head of the pin is made polygonal so that it may be readily turned by a wrench.

I desire it to be understood that I do not limit myself to the precise details of construction herein shown and described, as I may without departing from the spirit of the invention make minor changes herein, such as dispensing with the threads of the pin and providing other means for holding the pin against turning, although the threads are considered preferable.

What I claim is—

1. In a nut lock, the combination of a bolt provided with a longitudinal bore and having an opening communicating with the bore, a nut arranged on the bolt, a pawl arranged in the opening of the bolt, and a pin arranged in the bore and having a cam portion arranged to engage the pawl to force the latter outward in engagement with the nut, substantially as described.

2. In a nut lock, the combination of a bolt having a longitudinal bore and provided with an opening communicating with the bore and disposed longitudinally of the bolt, a pawl arranged within the opening and having its outer edge oppositely beveled, a nut arranged on the bolt, and a pin arranged within the bore and provided with a recess forming an inclined portion or cam arranged opposite the opening and adapted to force the pawl outward, substantially as described.

3. In a nut lock, the combination of a bolt provided with a longitudinal bore and having the outer portion thereof threaded and provided with an opening communicating with the bore, a nut arranged on the bolt, a pawl arranged within the opening and adapted to engage the bolt, and a pin arranged within the bore and having a threaded portion screwing into the threaded portion of the bore, said pin being provided with a cam portion inclining inward in a direction opposite the direction of the threads and adapted to force the pawl outward, whereby any tendency of the pin to unscrew will force the pawl outward and cause the same to engage the nut more tightly, substantially as described.

4. The combination in a nut lock, of a bolt having a longitudinal bore provided with a threaded portion, and having an opening communicating with the bore, a pin having a polygonal head and arranged within the bore and provided with a cam portion and having a threaded portion arranged adjacent to the head and engaging the threaded portion of the bore, a nut arranged on the bolt, and a pawl arranged within the opening and adapted to be engaged by the cam portion of a pin, substantially as described.

In testimony that I claim the foregoing as my own I have hereto affixed my signature in the presence of two witnesses.

E. POOLE.

Witnesses:
JOHN H. SIGGERS,
W. S. DUVALL.